July 28, 1942.   J. L. SIMPSON   2,291,173
MULTIPLE PICTURE PROJECTION SLIDE
Filed Aug. 5, 1941
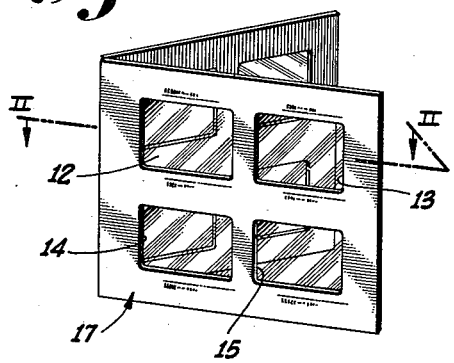
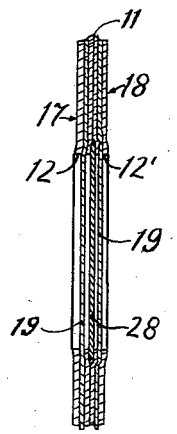
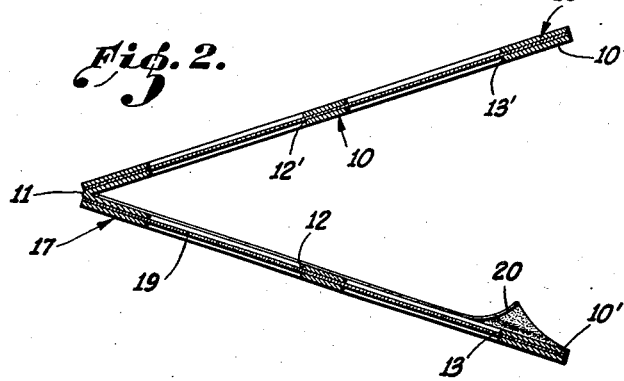
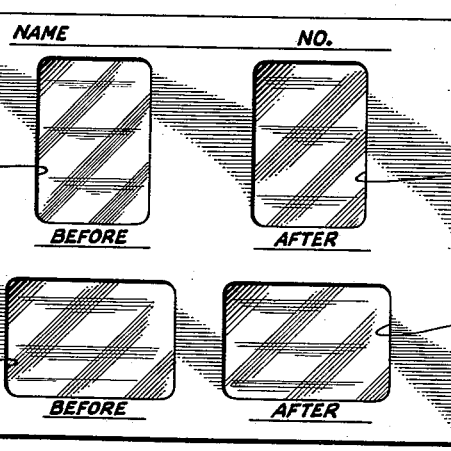
JOSEPH L. SIMPSON
INVENTOR
BY
ATTORNEY.

Patented July 28, 1942

2,291,173

UNITED STATES PATENT OFFICE 2,291,173

MULTIPLE PICTURE PROJECTION SLIDE

Joseph L. Simpson, Los Angeles, Calif.

Application August 5, 1941, Serial No. 405,561

3 Claims. (Cl. 40—158)

The present invention pertains to an improved holder and projection slide for transparencies, the device of this invention being particularly well adapted for use by dentists, engineers, builders, cosmetologists and numerous others engaged in work which may be illustrated by pictorial representations. For example, the present invention is well adapted for use in handling photographic transparencies made by dentists of their patients before and after the patients have been subjected to dental work. Such photographic representations may be mounted in the holder of this invention and such holder used as a slide whereby a plurality of views may be simultaneously projected for detailed examination.

The combined holder and projection slide of this invention is further characterized by the provision of means whereby the delicate surfaces of photographic transparencies are suitably protected against staining, abrasion and other disfigurement. Moreover, the holder and slide of this invention is a complete article which may be used without the necessity of applying tape or other binding materials to the edges, without the necessity of using adhesives, and without requiring additional materials or tools for its proper manipulation and completion. The device is provided with means which automatically signal to the user the condition of the holder and slide. It is of light weight, non-breakable and simple in operation and use.

Generally stated, the holder and slide of the present invention comprises a hinge element folded over onto itself, one inner face of such element being provided with a film of self-sealing or pressure-sealing adhesive. A plurality of openings is formed in each half of the hinge element and the adhesive is protected by a film of removable protective material. Transparent windows and cover plates are carried by the hinge element, the entire assembly constituting a holder into which the pictorial representations or transparencies may be readily fitted by the pressure-sealing or self-sealing adhesive which also acts to hold the hinge element in folded or closed position after the pictures have been suitably placed with respect to the openings.

An object of the present invention, therefore, is to disclose and provide a simple, unitary holder and projection slide for a plurality of pictorial representations whereby said representations may be simultaneously projected for purposes of comparison and study.

Another object of the present invention is to disclose and provide a simple holder for transparencies provided with means whereby the transparencies are protected.

Another object of the invention is to provide a multiple picture projection slide equipped with adhesive means for attaching pictures thereto and for assembling the slide.

Other objects and advantages of the invention will become apparent from the following description of exemplary forms of the invention. In order to facilitate understanding, reference will be had to the appended drawing, in which:

Fig. 1 is a perspective view of the multiple picture projection slide in a partly open position.

Fig. 2 is a transverse section taken along the plane II—II of Fig. 1.

Fig. 3 is a plan view of the cover plate on a modified form of slide.

Fig. 4 is an enlarged transverse section of a portion of the multiple slide, showing the mount in a closed position.

As shown in the drawing, the entire slide holder is a unit composed of two sections hinged together, each section being provided with a plurality of picture apertures, the apertures of each section being in registry with the apertures of the other. The construction of this holder can best be seen in Fig. 2 wherein a hinge element 10 is shown, folded at 11 so as to form the two sections 10' and 10" of the slide holder. Apertures 12, 13, 14 and 15 are formed in the section 10' and corresponding apertures such as 12' and 13' are formed in the section 10".

Each of the sections 10' and 10" is provided with a cover plate. For example, section 10' of the hinge element 10 is provided with a cover plate 17 whereas section 10" is provided with a cover plate 18. These cover plates are provided with apertures adapted to register with the apertures 12, 13, 14 and 15 in the hinge element. Between each cover plate and the hinge element there is cemented a sheet of transparent material, such as for example, the material 19, such transparent material extending over the apertures and forming windows therein. Various transparent plastics, cellulosic compositions and resinous compounds may be employed, Celluloid and "Kodapac" being two readily available and well known materials suitable for use in the manner stated.

The inner face of one of the sections of the hinge element is provided with a film of self-sealing or pressure-sealing adhesive. For example, the inner face of the section 10' may be provided with such a film. This pressure-sealing adhesive is then covered with a readily removable flexible sheet of material, indicated at 20. This protective sheet 20 need not be transparent and is preferably of such character as to but lightly adhere to the pressure-sealing or self-sealing material. Moreover, the protective sheet 20 is preferably of a distinctive and contrasting color so as to be readily visible through the various apertures 12 to 15 of the slide holder, thereby visually signalling the user of the device that the particular slide holder being examined does not contain pictorial representations or transparencies and is available for use.

Any suitable pressure-sealing or self-sealing adhesive may be employed. Various rubber cements, latex compositions, mixtures of latex and wax, and many thermoplastic or pressure-sealing organic compounds or mixtures thereof may be used.

The apertures 12, 13, 14 and 15 are preferably of a size adapted to properly receive and frame pictorial representations taken upon a suitable film. In most instances at the present time, colored transparencies are taken on 35 millimeter film so that the apertures 12 to 15 should be approximately 7/8" x 1" in size to properly frame pictures carried by sections of such 35 millimeter film. The cover 17 may carry indicia identifying the particular slide holder and the matter shown in the various apertures 12, 13, 14 and 15.

In Figs. 1 and 2 reference is made to a slide holder having four apertures arranged with their longitudinal axes parallel and horizontal. In Fig. 3 a modified form of cover plate is shown, such cover plate 23 being provided with apertures 24, 25, 26 and 27. It will be noted that in the arrangement illustrated in Fig. 3 two of the apertures, namely, apertures 24 and 25, are arranged with their axes vertical whereas the lower pair of apertures 26 and 27 have their axes horizontal. It is to be understood that the cover plate 23 is to be employed with a hinge element having apertures corresponding in size and location to those indicated on the cover plate 23.

The indicia carried by a cover plate and referred to hereinabove is more clearly indicated in Fig. 3. For example, if the slide holder is to be used by a dentist for the purpose of permitting his patient to visually compare the appearance and condition of his teeth both before and after dental work has been done thereon, the cover plate 23 may include indicia or blanks adapted to receive the name of the patient and a serial number of the slide. The various windows or apertures may be identified as by the words "before" and "after."

As an article of commerce, the multiple picture projection slide and holder described hereinbefore may be stored and shipped as a complete unit. When it is desired to use one of these devices, the operator or user simply removes or peels off the protective layer or sheet 20 from one of the inner faces of the hinge member 10 so as to expose the film of pressure-sealing adhesive. The developed transparencies (such as transparency 28, Fig. 4) are then placed in position on the inner surface 10' of the hinge member so as to extend over the desired aperture with the edges of the transparency in contact with the adhesive. The adhesive holds each transparency in position over its corresponding aperture. The entire device is then folded so as to place the section 10' in contact with section 10", the pressure-sealing adhesive then holding the two sections of the hinge element 10 in contact, as best shown in Fig. 4. The sheets of window material 19 and 19' protect the surfaces of the transparencies against abrasion, handling, or the like. The completed transparency holder may now be employed as a slide without additional treatment of any sort. Preferably, multiple projection slides of the character described here are used in a projector capable of passing light through at least two and preferably four transparencies simultaneously so that the observer or patient may visually compare the transparencies in their projected or enlarged form.

It will be evident to those skilled in the art that a number of changes and modifications may be made in carrying out the invention. The sheet material used for the hinge element 11 is preferably a strong fibrous sheet material capable of being bent or folded without breakage. The cover sheets or cover members 17 and 18 may comprise suitably coated or pressed fibrous sheets such as two to six ply board, these cover sheets imparting rigidity to the entire slide holder. Moreover, the inner surface of the hinge element 10 adjacent the apertures formed therein may be embossed, particularly on the inner face of the section 10' adjacent the apertures formed therein for the purpose of receiving and seating the outer edges of the transparencies which are to be mounted in such apertures.

These and other changes, modifications and adaptations of the invention are embraced by the following claims.

I claim:

1. A multiple picture projection slide comprising: an inner hinge element composed of sheet material folded over onto itself to form overlying coextensive halves; a plurality of apertures formed in each half of the hinge element, the apertures in one half being adapted to register with the apertures in the other half when the hinge element is closed; a film of self-sealing adhesive on the inner face of one-half of said hinge element, said adhesive being substantially coextensive with the unapertured surface of said half; a cover plate provided with a plurality of apertures adapted to register with the first-mentioned apertures, attached to the outer surface of one-half of said hinge member, and a sheet of transparent protective material positioned between said cover plate and hinge member and extending over said aperture.

2. A multiple picture projection slide comprising: an inner hinge element folded over onto itself; a plurality of apertures formed in each half of the hinge element, the apertures in one half being adapted to register with the apertures in the other half when the hinge element is closed; a film of self-sealing adhesive on the inner surface of one-half of said hinge element; a cover plate provided with a plurality of apertures adapted to register with the first-mentioned apertures, attached to the outer surface of one-half of said hinge member, and a sheet of transparent protective material positioned between said cover plate and hinge member and extending over said aperture.

3. A multiple picture projection slide comprising: an inner hinge element folded over onto itself; a plurality of apertures formed in each half of the hinge element, the apertures in one half being adapted to register with the apertures in the other half when the hinge element is closed; each aperture being slightly smaller than a picture transparency to be mounted therein; a film of self-sealing adhesive on the inner surface of one-half of said hinge element; an indicator sheet removably connected to said self-sealing adhesive and extending over the apertures; a cover plate provided with a plurality of apertures adapted to register with the first-mentioned apertures, attached to the outer surface of one half of said hinge member; a sheet of transparent protective material positioned between said cover plate and hinge member and extending over said apertures; and indicia carried by the outer surface of said cover plate adjacent each of said apertures.

JOSEPH L. SIMPSON.